United States Patent [19]

Larsen

[11] 4,171,174

[45] Oct. 16, 1979

[54] SYSTEM FOR DEPOSITING AND PROTECTING SAND AND OTHER LITTORAL DRAFT MATERIAL

[76] Inventor: Ole J. F. Larsen, Hjerting, Denmark

[21] Appl. No.: 849,648

[22] Filed: Nov. 8, 1977

Related U.S. Application Data

[63] Continuation-in-part of Ser. No. 644,916, Dec. 29, 1975, Pat. No. 4,077,222.

[51] Int. Cl.² .............................................. E02B 3/04
[52] U.S. Cl. ...................................... 405/25; 405/74; 405/157
[58] Field of Search .............. 61/2, 3, 4, 1 R, 106, 61/102, 37, 38

[56] References Cited

U.S. PATENT DOCUMENTS

| 929,728 | 8/1909 | Taylor | 61/38 |
|---|---|---|---|
| 1,071,091 | 8/1913 | Rogers | 61/38 |
| 1,164,708 | 12/1915 | Edinger | 61/38 |
| 2,870,609 | 1/1959 | Siebenhausen, Jr. et al. | 61/102 |
| 3,247,672 | 4/1966 | Johnson | 61/101 |
| 3,733,831 | 5/1973 | Sticker, Jr. | 61/4 |
| 3,844,123 | 10/1974 | Larsen | 61/3 |
| 4,028,894 | 6/1977 | Larsen | 61/3 |

Primary Examiner—Mervin Stein
Assistant Examiner—Alexander Grosz
Attorney, Agent, or Firm—Diller, Ramik & Wight

[57] ABSTRACT

This invention relates to a system for depositing and protecting sediments on the floor of a body of water by utilizing a pair of rigid cast sheets of heavy material which are hinged together to form an arch-shaped device with the weight thereof being utilized to maintain the device in bridging relationship to a pipe or like installation resting on the floor of the body of water. The arch-shaped device has a generally central apex portion and opposite leg portions with respective upper convex and lower concave surfaces which diverge away from each other in a direction away from the apex portion.

30 Claims, 42 Drawing Figures

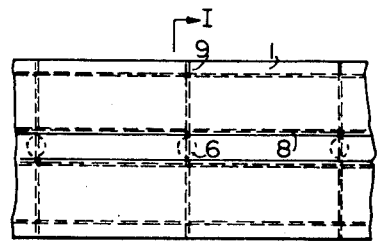
FIG.1
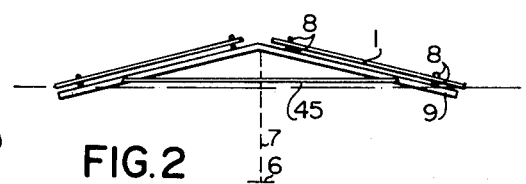
FIG.2
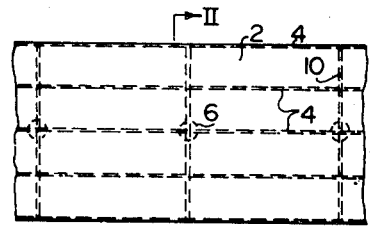
FIG.3
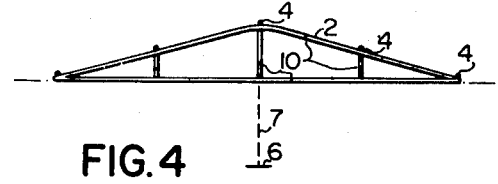
FIG.4
FIG.5
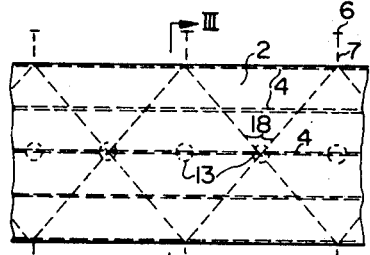
FIG.6
FIG.7
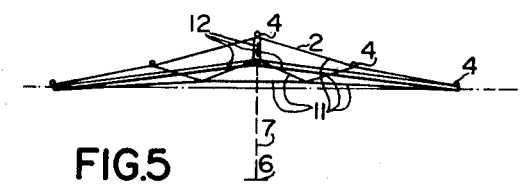
FIG.8
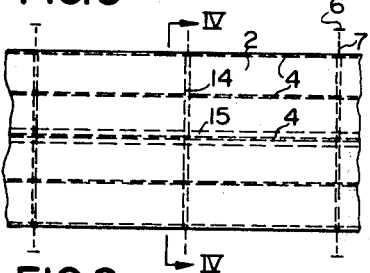
FIG.9
FIG.10
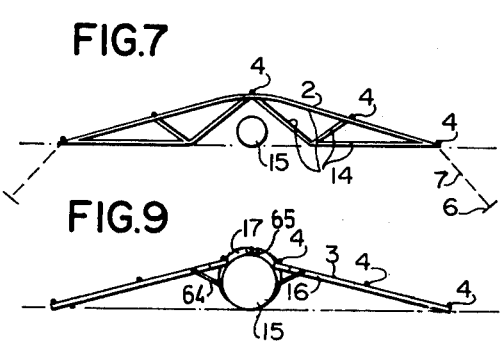
FIG.11
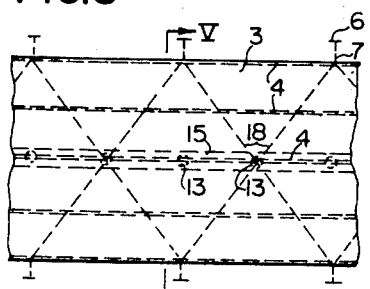
FIG.12
FIG.13
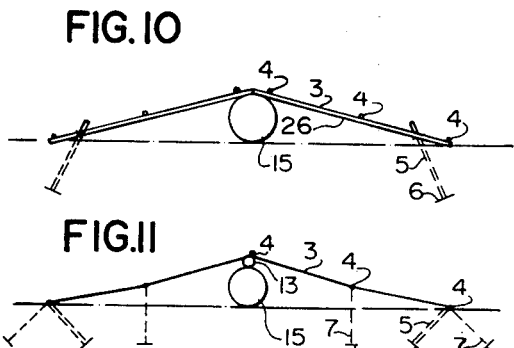

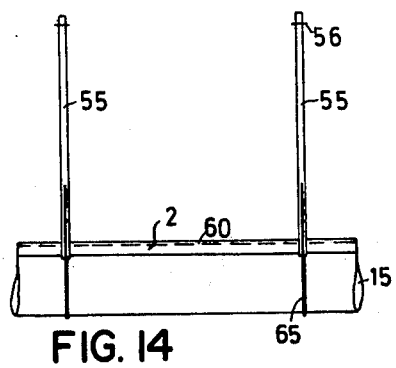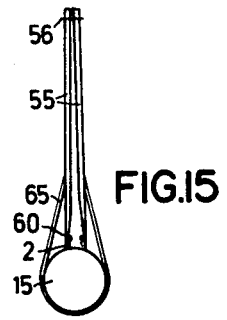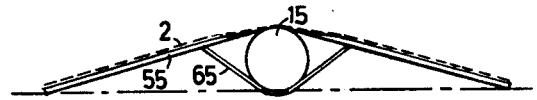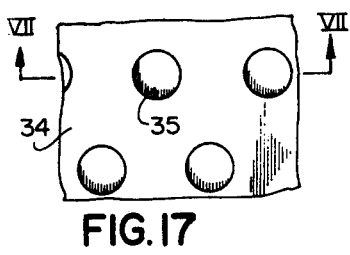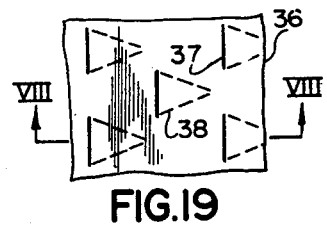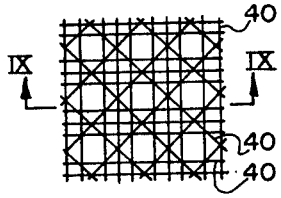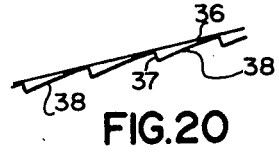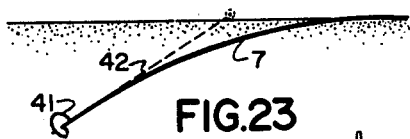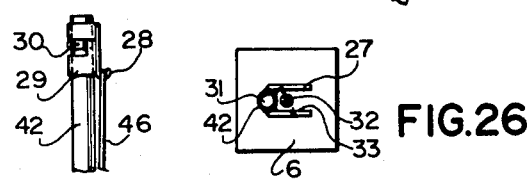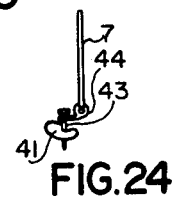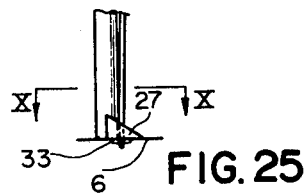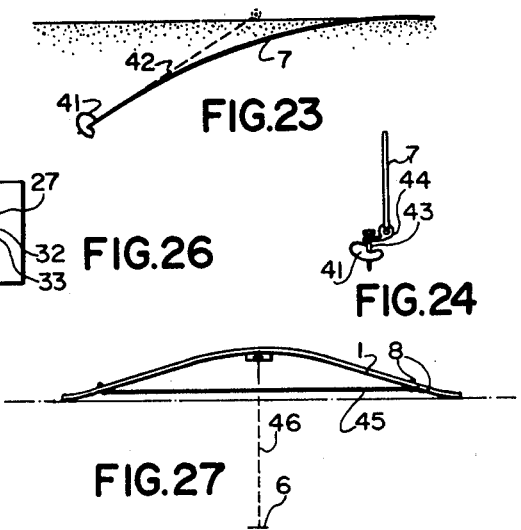

SYSTEM FOR DEPOSITING AND PROTECTING SAND AND OTHER LITTORAL DRAFT MATERIAL

This application is a continuation-in-part of copending application Ser. No. 644,916, filed Dec. 29, 1975, in the name of Ole Jeppe Fjord Larsen, and now U.S. Pat. No. 4,077,222.

The invention relates to a system for depositing and protecting sand and other littoral drift material on the floor of a sea, lake, river or other body of water.

Various kinds of barriers exist or have been proposed in the form of groins, breakwaters, and the like. But all of them are so deficient technically or aesthetically, and/or so expensive that coastal protection on a sufficiently large scale so far has been out of the question.

The system combines technical perfection with very low cost, allowing for large scale coastal protection. By placing the device with its longitudinal direction perpendicular to the coast, an effect comparable with that of a natural submarine reef is obtained. The streamlined cross-section, the flat slopes and properly proportioned apertures make up a device that traps the drifting sediment and protects it from scouring. Thereafter deposition of sediment on top and along both sides of the device gradually builds up a shoal extending far away from the device in all directions. Like natural reefs this shoal refracts the waves and spreads their energy. By building such headlands at suitable intervals, a stabilization of a whole coastline can be achieved.

Besides for coastal protection, the system may be used for other purposes, e.g., prevention of siltation in navigable channels and harbour mouths. In such cases, the device is placed along the channel or the harbour mouth on its both sides, thereby forming a hindrance for passage of the drift material.

Being completely submerged, this device does not disfigure the coast, opposite the traditional groins, breakwaters, etc.

Another field of application is protection from undermining of lengthy hydraulic structures such as submarine pipelines, cables, foundations and the like. In this case, the device is placed on top of the structure to be secured and thereby causes an accumulation of sediment along both sides of the structure.

The description will be illustrated by reference to the drawings in which

FIG. 1 is a plan view of corrugated plates 1 assembled by shapes 8 and supported on angled shapes 9 and anchored to discs 6 through ropes 7;

FIG. 2 is a cross-section taken along the line 1—1 of FIG. 1;

FIG. 3 is a plan view of a perforated sheet 2 assembled by longitudinal shapes 4 and supported on lattice trusses 10 and anchored to discs 6 through ropes 7;

FIG. 4 is a cross-section taken along the line II—II of FIG. 3;

FIG. 5 is a cross-section of a perforated sheet 2 assembled by longitudinal shapes 4 and supported on rope forming a lacing 11 stretched by 3 struts 12 in hinged interconnection in one point at the middle;

FIG. 6 is a plan view of a perforated sheet 2 assembled by longitudinal shapes 4 and reinforced by zig-zag wire ropes 18 and supported on inflatable spheres 13 and anchored and stretched by discs 6 through anchoring ropes 7;

FIG. 7 is a cross-section taken along the line III—III of FIG. 6;

FIG. 8 is a plan view of a perforated sheet 2 assembled by longitudinal shapes 4 and supported on lattice trusses 14 consisting of two symetrical halves which are interconnected at a point above the pipeline or other structure 15 which is to be protected from scour;

FIG. 9 is a cross-section taken along the line IV—IV of FIG. 8;

FIG. 10 is a cross-section of symmetrical halves of a sheet 3 supported by longitudinal shapes 4 on crossbeams 16 that are attached directly and through props 64 to clutches 17 which are tightened around the pipeline 15 by eccentrics 65 mounted on the clutches 17;

FIG. 11 is a cross-section of an impermeable sheet 3 containing apertures along its ridge and supported by longitudinal shapes 4 on pairs of shapes 26 that are in mutually hinged connected over the top of the structure 15 which is to be protected; the outer ends of 26 being supported on and anchored by poles 5 mounted on discs 6;

FIG. 12 is a plan view of an impermeable sheet 3 containing apertures 25 at the ridge and assembled by longitudinal shapes 5 and reinforced by zig-zag wire ropes 18 and supported on the pipeline 15 via inflatable spheres 13 and anchored by discs 6 through anchoring ropes 7 and poles 5, and stretched and prevented from flapping up and down by discs 6 through ropes 7;

FIG. 13 is a cross-section taken along the line V—V of FIG. 12;

FIG. 14 is a side view of a pipeline supplied with a folded device consisting of a flexible sheet, e.g., an open net 2, the center portion of which is fixed along the top of the pipeline, and both edges of which contain a longitudinal pipe for stretching and holding the sheet. Each supporting crossbeam 55 is hinged by one end to a clamp that is placed in the concrete coating of the pipeline or round the pipeline. In this folded position, the crossbeams two and two are held together by ties or clamps 56. Supplied with rings around the crossbeams 55 or sliders running in a longitudinal groove in each crossbeam, the sheet can be folded tight to the pipeline;

FIG. 15 is a cross-section taken along the line VI—VI of FIG. 14;

FIG. 16 is a cross-section of the device shown in FIGS. 14-15 when unfolded on the seabed.

FIG. 17 is a plan view of a segment of a sheet 34 shaped to form conical channels 35;

FIG. 18 is a cross-section taken along the line VII—VII of FIG. 17;

Figure 28:
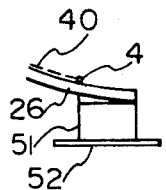
Figure 29:
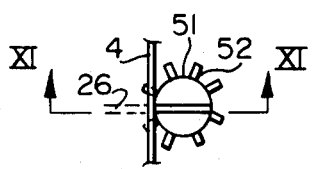
Figure 30:
Figure 31:
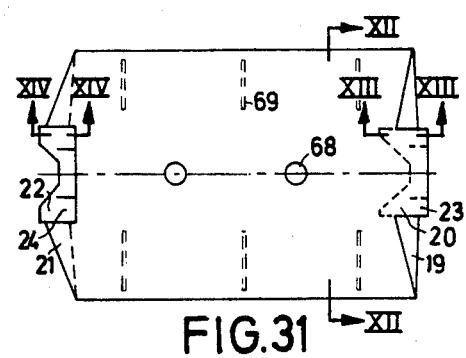
Figure 32:
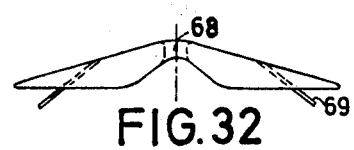
Figures 33, 34:
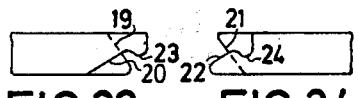

FIG. 19 is a plan view of a segment of a sheet 36 containing slits 37 and folds 38;

FIG. 20 is a cross-section taken along the line VIII—VIII of FIG. 19;

FIG. 21 is a plan view of a segment of a sheet consisting of several layers of mesh 40;

FIG. 22 is a cross-section taken along the line IX—IX of FIG. 21;

FIG. 23 is a vertical cross-section of an auger-formed disc 41 screwed into the ground by means of a detachable rod 42, the anchoring rope 7 in this case being fastened directly onto the disc 41;

FIG. 24 is a side view of an anchoring disc 41, to the center rod 43 of which the anchoring rope 7 is fastened via a rotating reaction ring 44;

FIG. 25 is a side view of a pipe 42 for conducting a water jet through the hole 31 of the disc 6 which is being pressed against the lower end of 42 and its two feet 27 by means of a neoprene ring 46, which has been put through the hole 32 of the disc 6, retained by a crosspiece 33, stretched and thereafter suspended from the hook 28 mounted on the clamp 29, the clamp 29 in this case being supported by the nut 30 fitting into screw thread on the outer surface of 42 allows for lowering of 29 after the positioning of 6, so that the upper end of 46 can be moved from 28 to the device to be anchored, and 42 be removed;

FIG. 26 is a cross-section taken along the line X—X of FIG. 25;

FIG. 27 is a cross-section of an embodiment consisting of a corrugated plate 1 with rounded and perforated ridge and stiffened by longitudinal shapes 8 and by ties 45 and anchored by discs 6 through stretched neoprene anchoring ropes 46;

FIG. 28 is a cross-section taken along the line XI—XI of FIG. 27;

FIG. 29 is a plan view of an open box-type anchor 51 supplied with horizontal bars 52;

FIG. 30 is a cross-section of a device made of concrete stiffened by ties 45;

FIG. 31 is a plan view of a concrete element primarily for protection of cables or small diameter pipelines; it is provided with holes 68 at the top;

FIG. 32 is a large-scale cross-section taken along the line XII—XII of FIG. 31;

FIG. 33 is a large-scale cross-section taken along the lines XIII—XIII of FIG. 31.

Figure 35:
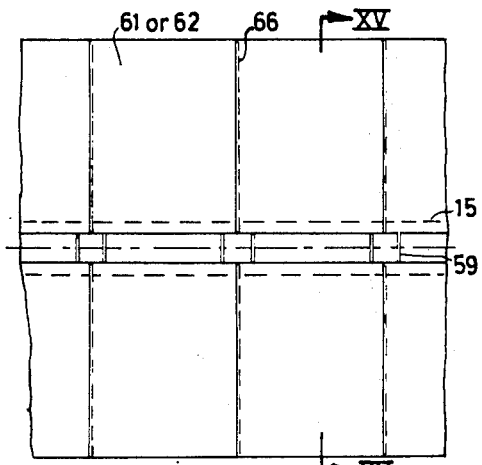
Figure 36:
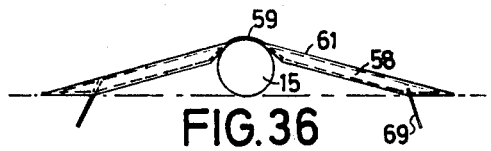
Figure 37:
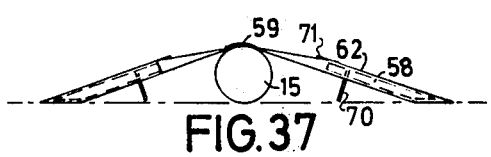
Figure 38:
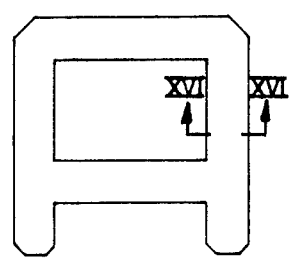
Figure 39:
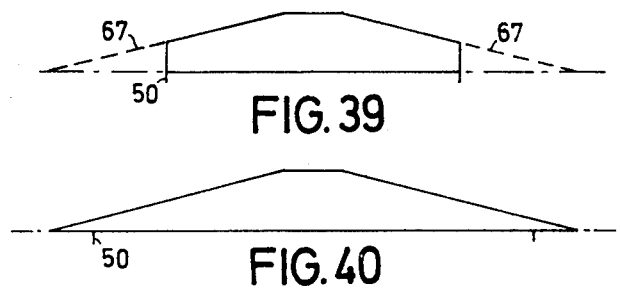
Figure 40:
Figure 41:
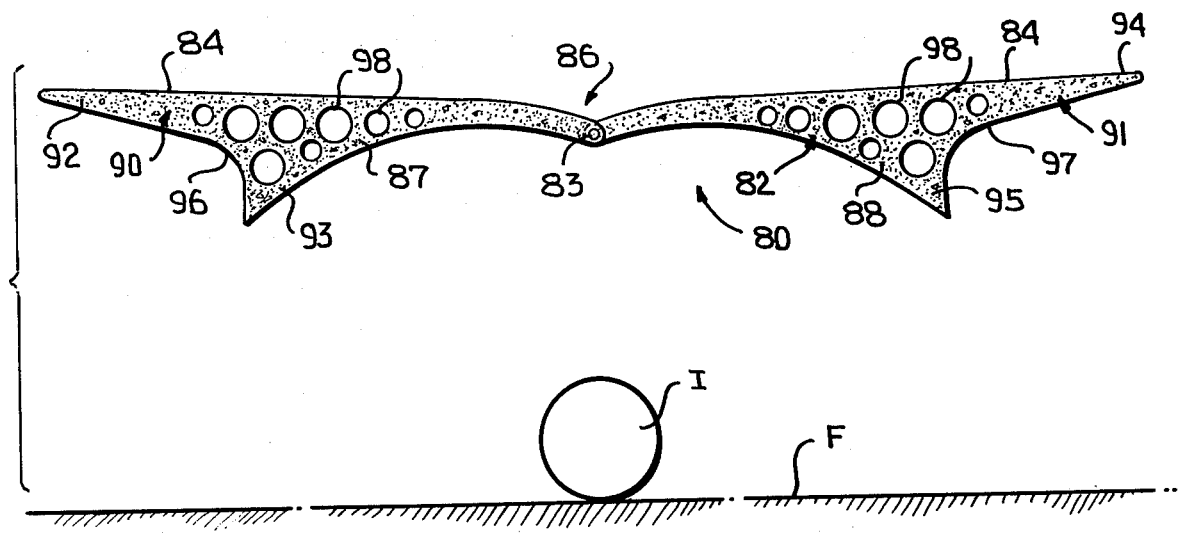
Figure 42:
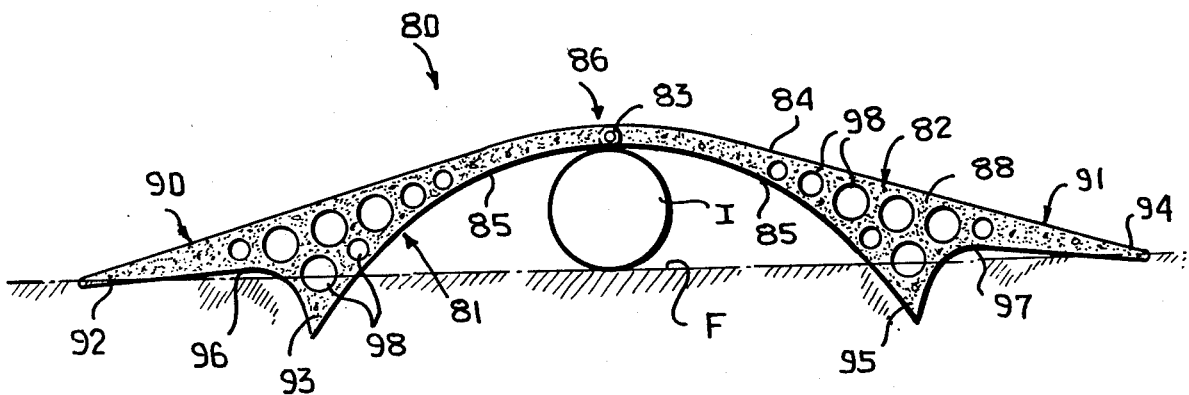

FIG. 34 is a large-scale cross-section taken along the line XIV—XIV of FIG. 31;

FIG. 35 is a plan view of a pipeline 15 protected by concrete elements 61 or 62 which contain channels 58 and are supported on the pipeline by means of clamps 59. The edges of the elements are formed with tongues and grooves 66, so that the elements form a continuous, coherent sheet on both sides of the pipeline;

FIG. 36 and FIG. 37 are alternative cross-sections taken along the line XV—XV of FIG. 35;

FIG. 38 is a plan view of the base of a special type of drilling rig;

FIG. 39 and FIG. 40 are alternative large-scale cross-sections taken along the line XVI—XVI of FIG. 38; and FIG. 41 and FIG. 42 are cross-sections of a device similar to FIGS. 30, 32, 36 and 37.

The ridge formed by the meeting of the two side portions should be rounded (FIGS. 4, 9, 10, 16, 27, 30, 32, 36, 37). The two side portions should not be too steep. To obtain the desired depositing effect and to prevent too heavy strain of the sheet, the surface of the side portions should not be steeper than about 1:4–1:3. The angle of slope may decrease gradually from the middle toward the edges of the device, to prevent local scour at the edges (FIGS. 13, 27, 30).

The device may be made of more or less flexible material. Rigid materials such as concrete, steel, aluminum, glassfiber-reinforced polyester or polyethylene are appropriate where the vertical component of the orbital motion of the waves is significant. To increase the stiffness and strength, sheet material may be corrugated (FIGS. 1-2, 27). The corrugation may be orientated parallel with or perpendicular to the lateral direction of the device. To avoid creation of turbulence, the surface of the top of the sheet should be even, without corrugation.

Suitable flexible materials are for example polyethylene, polyester, nylon, or natural fibers such as jute and sisal.

Depending on the purpose of the device and the prevailing conditions, the sheet may be impermeable, it may be provided with apertures located at the top of the ridge (FIGS. 1-2, 10, 27, 30), or a part of or all of the surface of the device may be perforated evenly or differentiatedly.

The sheet may consist of two or more separate layers of perforated material. If the percentage area of the apertures is rather small, the upward flow through the apertures at the leeside of the device hereby can be increased. In such case the upper layer(s) may be very flexible and a little wider or longer than the lower layer and be fastened to this in certain points only, so that it can rise a little distance above the lower layer for upward flow. If, on the other hand, the sheet consists of open net material (FIGS. 21-22), so that it cannot retain the particles of the sediment, the extra, larger layer(s) of net may be attached at certain points to the underside of the upper, stretched layer of net, and preferably be made of buoyant material. The upward flow will press the lower layer(s) against the upper layer, whereby the sediment will be prevented from passing through the nets.

The same effect as obtained with such extra layers of net can be achieved by a sheet consisting of open net that is supplied on its upper- respectively underside with strips of buoyant, flexible material attached by one end to the surface.

To prevent local scour under the edges of the device, the percentage area of the perforation may increase gradually from the ridge toward the edges of the device. In practice such gradual differentiation may be replaced by joining several layers of perforated sheets together and stepping down the number of layers toward the edges.

In particular in devices for protection of submarine structures, an opening along the ridge (FIGS. 1-2, 10-11) may be the only aperture of the device. It may be obtained by spacing the two interconnected side portions apart.

To prevent the coarser part of the sediment from becoming conducted up through the apertures, these may be covered with strainers made, for instance, of nylon mesh.

With the aims of increasing the rate of deposition of sediment and of preventing overloading of the device due to the impact of waves or due to deposition of sediment on top of the device, the sheet may be formed in special ways: The apertures may be provided with sheltering pockets 38 (FIGS. 19-20) which prevent the current above the device from passing down through the apertures 37, but allow for falling down of sediment deposited on the device. The pockets 38, made of flexible or stiff material, may be attached to the surface or be formed in the sheet itself by slitting and folding it up like the raised teeth of a shredder (FIGS. 19-20), if necessary stiffened by attached forms. The pocket may be placed on the top side and/or the underside of the sheet.

In some cases the object is, on the contrary, to accumulate a load of sediment on the device in order to keep the edges of the device tight to the floor. This may be achieved by means of pockets attached to the device, without perforation underneath the pockets.

The sheet may be shaped to form conical channels 35 with upwardly or downwardly decreasing cross-sectional area (FIGS. 17-18), or the sheet may have a grid structure with vertical and/or slanting sidewalls.

The build up underneath the device may be accelerated by a successive regulation of the effective flow area of the perforation. For example, in a device as shown in FIGS. 10, 11 or 13, it may be appropriate to start with a comparatively large flow area at the top of the device, allowing for a filling up of the hollow underneath the device within a minimum of time. When the hollow is almost filled, part of the apertures may be closed - e.g. by means of strips or flexible or stiff material attachable to the surface of the sheet - so that the deposition thereafter can grow all the way up to the underside of the sheet.

The join of the widths of material making up a flexible sheet may be made in several ways. In cases of staying of the sheet by means of rigid longitudinal and/or cross-stays 4 for prevention of flapping up and down of the sheet, the stays may be placed in sleeves made in the sheet material (FIGS. 9-13), or they may be formed as assembling bars 4 joining neighbouring widths together. For this purpose two opposite sides of each stay may contain a groove which embraces the bended edge or a bead molded in the edge of the width of sheet material.

A sheet may be supported in numerous ways. Its ridge may be supported on vertical poles driven, water-jetted, screwed or vibrated into the ground. Each pole may be mounted on a horizontal disk to increase the supporting area and serve as anchor. In case of water-jetting, the pole consists of a pipe, and the disk is perforated at its center, so that the water can be jetted through the pipe. In case of screwing, the disk is shaped as an auger with one turn.

A flexible sheet 2 as shown in FIGS. 6-7 may be supported at its middle by inflatable spheres 13 or by a continuous inflatable hose, allowing for a convenience way of installing the system and maintaining a perfect stretching of the sheet under all conditions.

Devices protecting submarine structures such as pipelines, cables, foundations, and the like, may be supported directly on the structure (FIGS. 10, 39) or via spheres 13 (FIGS. 12-13) or via continuous hose.

The side portions may be supported on lattice girders (FIGS. 3-4,9) made of such materials as steel, aluminum or glassfiber-reinforced polyester. A special design is shown in FIG. 5. The three points of a skeleton consisting of three rigid members 12 are connected by a rope 11 on which the sheet 2 is supported. By the use of rope instead of rigid members, bending forces are avoided.

In systems protecting submarine structures (FIGS. 9-13) the girders may consist of two symmetrical halves supported at the middle of the structure (FIGS. 10-11) or on each other a distance above the structure (FIG. 9). To prevent any flapping up and down of the sheet, tethering 7 (FIG. 12) of intermediate points of the sheet may be necessary.

In cases where the bending moments are not too great, the lattice girders may be replaced by beams 16 or 26 (FIGS. 10-11). Where the vertical motions of the water are ignorable, e.g. at great depths of water, no support of the side portions may be required (FIGS. 6-7, 12-13).

Due to their weight, devices made of concrete normally need no anchoring. Small device such as elements for protection of cables and small diameter pipelines, FIGS. 31-34, are easily handled by the divers. To enhance the stability of the elements they may be interlocked by means of tilted end surfaces 19-22 and/or tongues 23 and grooves 24.

Larger devices of concrete, FIGS. 35-37, require utilization of buoyancy to enable the divers to handle them under water. Appropriately, each element 61 or 62 contains a system of interconnected air-filled channels 58 making up such portion of the total volume that the element is weightless underwater. If necessary, lightweight concrete may be used. During the installation, the channels 58 are closed by a valve or a cork closing the one or two holes connecting outwardly the system of channels. When the elements are in place, the valves are opened, respectively, the corks removed, so that the channels become filled with water.

Alternatively, water-absorbent lightweight concrete with or without channels may be used. For instance, the surface of each element may consist of water-tight concrete, whereas the interior of the plate consists of lightweight concrete that is only connected outwardly through one or two openings that can be closed. Or the plate consists exclusively of absorbent lightweight concrete, the surface of which during the installation is covered by a detachable sheet of impermeable plastic.

A system consisting of open net (FIGS. 21-22) needs only little anchoring. FIGS. 28-29 show an anchor to be fixed to the lower ends of the cross-girders 9, 10, 14, 16 or 26, or to the edges of the sheet. It consists of a flat, circular or angular box 51 which is open at its upper end so that it will become filled with the drifting sediment. Level with its bottom its periphery may be supplied with horizontal bars 52 to resist upheaval through the bed sediment when the box has been undermined and sunk by the waves and currents, after having been placed on the bed.

Lighter devices made of solid materials normally have to be anchored in the ground. The anchoring at the edges (FIGS. 6-7, 12-13) or at the middle (FIGS. 1-5, 15, 27) may be effected by disks 6 that are water-jetted or screwed into the ground. The discs may be connected with the device by means of rope 7 (FIGS. 2, 4, 5, 15), or by poles 5 as described above, in cases where a support of the edges of the system is required, e.g. because of initial scour at the edges. The rop 7 appropriately is connected to the screw-anchor 41 (FIG. 24) through a rotating reaction ring 44.

To keep the edges of systems as shown in FIGS. 1-5, 15, 27 tight to the floor under all conditions, so that the currents cannot get underneath the edges and remove the device, the rope 7 should include elastic parts 46 (FIGS. 25-27), e.g. neoprene, which are stretched sufficiently to absorb under steady tensioning any possible settlement of the device. Preferably the elastic member 46 fastened at its lower end ot the disk 6 should be placed and stretched by means of, possible inside, the detachable pipe 42 for water-jetting or screwing the disk 6 into the ground. After positioning of the disk, the upper grip of the elastic member 46 is transferred from the pipe 42 to the device, and the pipe is removed.

To minimize the expensive underwater work, the device should be prefabricated, so that only the anchoring has to be carried out underwater. Devices as shown in FIGS. 1-5, 27 and 30 may be assembled in complete sections on the beach and thereafter rolled, e.g. on inflatable plastic rollers, and floating on the rollers to the site where the system is to be installed. Here the rollers are detached, and the section sinks to the bottom where it is anchored, if necessary.

On new pipelines to be laid on the seabed or riverbed, a collapsible device as shown in FIGS. 14-16 may be mounted on the pipeline before its launch from the lay barge. The device consists of a flexible sheet 2 supported by cross-beams 55 divided in symmetrical halves which are hinged by one end to clamps placed in the concrete coating of the pipeline or round the pipeline or cable. The sheet is in fixed connection with the cross-beams and/or the pipeline along the centerline of the device only. Along either edge the sheet contains a pipe 60 for stretching of the sheet. Supplied with rings around the cross-beams or sliders running in a longitudinal groove in each cross-beam the sheet can be folded compactly along the centerline before the launch of the pipeline. With the cross-beam two and two temporarily tied or clamped together in a vertical position, the device can pass through the stinger of the lay barge, without regard to the width of the stinger.

To ease the unfolding of the device when the pipeline or cable has been placed on the seabed or riverbed, a system of elastic members may automatically unfold the cross-beams as well as the sheet when the diver has opened the clamps that temporarily have held the cross-beams in a vertical position. For example, a neoprene strap 65 fixed to each pair of cross-beams and surrounding the pipeline will unfold the beams and press them against the seabed, when the temporary clamps 56 are opened. Correspondingly, stretched elastic straps connecting the longitudinal pipes 60 with the outer ends of the cross-beams may automatically unfold the sheet when the cross-beams move from vertical to horizontal position. The release of these straps may be effected by the impact of the cross-beams hitting the ground or by the movement and/or geometrical change of the members locking the longitudinal pipes and the sheet in folded position.

Besides accumulation of sediment around a submarine structure, the object of a system often is to prevent ships' anchors, dragnets, etc., from catching hold of and damaging the structure. A system as shown in FIGS. 35-37 is ideal in this respect. Even if an anchor should catch hold of the lower edge of an element and even if it should be able to remove the coherent assembly of elements, the upper edge of the element would rise, thereby raising the anchor-chain and the anchor-shank so that the anchor in any case would slip over the pipeline.

To cause the anchor-blade or anchor-arms to be lifted as high above the pipeline as possible, projections 69 on the underside of the element may be appropriate. When a removed element slides across the pipeline, and the projection 69 reaches the pipeline, the edge of the element carrying the anchor will be lifted further upwards, so that the blade or arms of the anchor are prevented from damaging the pipeline. The projections 69 may be pipes embedded in the concrete or mounted through holes in the concrete after positioning of the element.

Alternatively, such lifting of the anchor-blade or anchor-arms may be brought about by corresponding projections 70 and 71. When a removed element 61 or 62 slides across the pipeline, the projections 70 will reach the pipeline and then cause the element to rotate around the centerline of the pipeline until the former upper edge of the element reaches the surface of the element on the other side of the pipeline. Located properly in relation to 70, the projections 71 now will catch hold of the former upper edge of the removed element and cause the element to turn about this edge, thereby lifting even higher the anchor carried by the former lower edge of the element.

A smaller device as shown in FIGS. 31-34 may turn about the edge opposite the edge caught by the anchor or fishing gear and thereby lift the anchor-shank. To call forth such turning, the element should be provided with downward projections to ensure sufficient resistance from the bed sediment. Appropriately, such projections may be obtained by corrugating the lower edge in both sides of the element, the waves of the corrugation being perpendicular to the pipeline and the wave-height gradually decreasing from maximum at each edge to zero along the ridge of the element. Alternatively, the underside of the element may be provided with projections descending into the bed sediment, or the edges may end as vertical skirts, or the element may include inclined or vertical pins 69 embedded in the element or stuck into the seabed through holes in the lemenet after positioning of this. In a device consisting of a sheet supported by stays 4 and cross-beams 26, these members may be made strong enough to carry the weight of a ship's anchor and/or the anchor-chain, whereby this device will conduct the anchor over the pipeline in the same way as the above device made of concrete.

In many cases the lengthy structure to be secured only needs protection on one side. In such cases the exposed side of the structure is protected by the corresponding half of the symmetrical system concerned. For example, a pipeline crossing a river only needs protection on its upstream side, if the current is always unidirectional, and the wave action is inessential. Similarly, a steep seawall, mole or quay may be protected from the undermining effect of waves and currents by such sheet.

Other special types of offshore structures to be secured include the base structures of certain types of platforms, e.g. the type shown in FIG. 38. An appropriate device in such case includes detachable sections of rigid material 67, e.g. steel. They may be hinged pivotally to the edges of the foundation, so that they can rest on top of this during the transport of the platform to a new location, and be swung down on the seabed when the foundation has reached the seafloor. To obtain the optimum configuration of the whole, the foundation itself should be formed with a cross-section as shown in FIG. 39 or FIG. 40 to prevent any undermining. A vertical skirt 50 penetrating into the seabed along the edges of the foundation helps prevent flow along the underside of the structure.

Reference is now made to FIGS. 41 and 42 of the drawings which illustrate another device or member 80 for depositing and protecting sediment on a Floor F of a body of water (not shown) by spanning a submerged installation I, such as a pipe or cable.

The member 80 is generally arch-shaped and is formed of two rigid cast sheets 81, 82 hingedly connected together by hinge means 83 which may be, for example, a rod (unnumbered) in the sheets 81, 82. The member 80 has an upper convex surface 84 and a lower concave surface 85, the latter of which opens in a direction toward the floor F in the operative position (FIG. 42) thereof.

The member 80 in the area of the hinge means 83 includes a generally central apex portion 86 defined by adjacent portions (unnumbered) or opposite leg portions 87, 88 of the respective sheets 81, 82 which terminate in respective feet 90, 91. The convex and concave surfaces 84, 85 diverge away from each other in a direction away from the apex portion 86 toward and through the leg portions 87, 88 and to the feet 90, 91. Each of the feet 90, 91 are defined by respective pairs of apices 92, 93 and 94, 95 defined in part by respective downwardly opening concave terminal surfaces 96, 97. A plurality of varied sized generally parallel bores, channels or chambers 98 which run the length of the sheets 81, 82 and open through opposite transverse end faces (not shown) thereof to lighten the overall weight of the device 80 particularly when formed of relatively heavy cast cementious material, such as reinforced concrete.

The hinge means 83 permits the cast sheets 81, 82 to be hinged to an inoperative position (FIG. 41) at which the surface 84 is generally parallel to the horizontal. In this poistion the device 80 can be gripped by conventional vacuum or suction devices (not shown) applied against the surface 84. The vacuum devices are preferably carried by a frame (not shown) which through a hoist (also not shown) may be raised or lowered to, for example, lift the device 80 from aboard a vessel (not shown) when disposed as in FIG. 41, and lower the same to the operative position (FIG. 42) after which the vacuum effect is broken and the installation procedure repeated as necessary to place others of the devices 80 in overlying relationship to the installation I.

Although only a preferred embodiment of the invention has been specifically illustrated and described herein, it is to be understood that minor variations may be made in the system without departing from the spirit and scope of the invention, as defined in the appended claims.

I claim:

1. A device for protecting a lengthy installation on the floor of a body of water comprising generally polygonally shaped means as viewed in top plan for defining a generally arch-shaped member as viewed in end elevation having an upper convex surface and a lower concave surface adapted to open in a direction toward the floor of a body of water, said arch-shaped member having a generally central apex portion and opposite leg portions, and said convex and concave surfaces diverge away from each other in a direction away from said apex portion and toward said leg portions.

2. The device as defined in claim 1 wherein said member is formed of cast material.

3. The device as defined in claim 1 wherein said member is formed of cast cementious material.

4. The device as defined in claim 1 wherein said leg portions terminate in feet, and said feet each includes a concavely downwardly opening terminal surface.

5. The device as defined in claim 1 wherein said member is defined by a pair of sheets, each of said sheets having opposite first and second edge portions, said first edge portions being located at said central apex portion, and means hingeably connecting said first edge portions to each other.

6. The device as defined in claim 1 wherein said member is formed of relatively heavy cast material, and a plurality of thru-opening channels are formed in said member between the confines of said convex and concave surfaces for reducing the weight of said member.

7. The device as defined in claim 1 wherein said lower concave surface blends with oppositely directed generally horizontally disposed surfaces.

8. A device for protecting a lengthy installation on the floor of a body of water comprising an elongate plate-like structure which is generally polygonally shaped as viewed in top plan, said plate-like structure including a longitudinally extending center portion which in use is placed over a lengthy installation, and two longitudinally extending side portions the upper surfaces of which in use diverge away from each other toward the floor, said plate-like structure being generally arch-shaped as viewed in end elevation, said plate-like structure having a lowermost downwardly facing concave surface opening completely through said plate-like structure, and said plate-like structure being so heavy that no anchoring of the structure is necessary and is thus devoid of any anchoring means or attaching means therefor.

9. The device as defined in claim 8 wherein said center portion is upwardly convexly rounded.

10. The device as defined in claim 8 wherein said side portions slope downwardly at between 1:4 and 1:3 to the horizontal.

11. The device as defined in claim 8 wherein the angle of slope of each of said side portions decreases towards an outer edge of each of the side portions.

12. The device as defined in claim 8 wherein undersides of said side portions are generally horizontal.

13. The device as defined in claim 8 wherein said plate-like structure is divided into two symmetrical halves that are hinged together along a longitudinal centerline of the structure.

14. The device as defined in claim 8 wherein in use, the plate-like structure includes means permeable to a vertical flow of water.

15. The device as defined in claim 14 wherein said permeable means is located in said center portion of the plate-like structure in the form of a longitudinally extending slit providing a control opening for the vertical flow of water.

16. The device as defined in claim 14 wherein at least part of the plate-like structure includes said permeable means in the form of a plurality of perforations.

17. The device as defined in claim 16 wherein the percentage hole area of said perforations varies over the surface of said plate-like structure.

18. The device as defined in claim 17 wherein said percentage hole area increases gradually from a centerline of said plate-like structure toward the periphery thereof.

19. The device as defined in claim 8 wherein said plate-like structure is corrugated.

20. The device as defined in claim 19 wherein waves of said corrugated structure are perpendicular to the longitudinal direction of said plate-like structure, and wherein the wave height of said corrugated structure decreases gradually from a maximum at the lateral edges to zero toward the centerline of said ridge-like structure.

21. The device as defined in claim 8 wherein the plate-like structure includes projections alternating with perforations through the structure.

22. The device as defined in claim 8 wherein said plate-like structure is made up of a composite of flexible and rigid members.

23. The device as defined in claim 22 wherein said flexible members consist of one or more, separate or joined layers of plastic mesh.

24. The device as defined in claim 23 wherein flexible strips of buoyant material are attached by one end to the surface of said mesh.

25. The device as defined in claim 23 wherein said flexible members are supported on a framework of longitudinally and transversely extending beams spanning from one lateral edge of said plate-like structure to the other, or divided in symmetrical halves hinged together along the centerline of said structure.

26. The device as defined in claim 8 wherein said plate-like structure consists of a grid with vertical and/or slanting sidewalls.

27. The device as defined in claim 8 wherein undersides of the side portions of said plate-like structure are provided with projections.

28. The device as defined in claim 8 wherein said plate-like structure contains cavities for buoyancy purposes.

29. The device as defined in claim 28 including means for controlling the amount of water or air of said cavities.

30. A device for protecting a lengthy installation on the floor of a body of water comprising an elongate sheet which is generally polygonally shaped as viewed in top plan, said sheet including a longitudinally extending center portion which in use is placed over a lengthy installation, and two longitudinally extending side portions, said center portion being generally arch-shaped as viewed in end elevation, said center portion having a lowermost downwardly facing concave surface opening completely through said sheet, and said sheet being so heavy that no anchoring of the structure is necessary and is thus devoid of any anchoring means or attaching means therefor.

* * * * *